(12) United States Patent
Hashimoto

(10) Patent No.: US 12,559,260 B2
(45) Date of Patent: Feb. 24, 2026

(54) AIRCRAFT MONITORING SYSTEM

(71) Applicant: DENSO CORPORATION, Kariya (JP)

(72) Inventor: Mariko Hashimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 251 days.

(21) Appl. No.: 18/377,392

(22) Filed: Oct. 6, 2023

(65) Prior Publication Data

US 2024/0043141 A1 Feb. 8, 2024

Related U.S. Application Data

(63) Continuation of application No. PCT/JP2022/010588, filed on Mar. 10, 2022.

(30) Foreign Application Priority Data

Apr. 8, 2021 (JP) .................................. 2021-065814

(51) Int. Cl.
| | |
|---|---|
| *B64F 5/60* | (2017.01) |
| *B64C 27/08* | (2023.01) |
| *B64C 29/00* | (2006.01) |
| *B64C 39/02* | (2023.01) |
| *B64D 45/00* | (2006.01) |
| *B64D 47/08* | (2006.01) |
| *G06T 7/00* | (2017.01) |

(52) U.S. Cl.
CPC ................ *B64F 5/60* (2017.01); *B64C 27/08* (2013.01); *B64C 39/02* (2013.01); *B64D 45/00* (2013.01); *B64D 47/08* (2013.01); *G06T 7/0002* (2013.01); *B64C 29/0008* (2013.01); *B64D 2045/0085* (2013.01); *G06T 2207/30261* (2013.01)

(58) Field of Classification Search
CPC ........... B64F 5/60; B64D 45/00; B64D 47/08; B64D 2045/0085; B64D 47/02; B64D 47/06; B64C 27/08; B64C 39/02; B64C 29/0008; G06T 7/0002; G06T 2207/30261
See application file for complete search history.

(56) References Cited

U.S. PATENT DOCUMENTS

| | | | | |
|---|---|---|---|---|
| 6,129,306 | A * | 10/2000 | Pham ...................... | B64C 37/00 244/50 |
| 10,351,235 | B2 * | 7/2019 | Karem .................. | B64C 11/325 |
| 10,896,512 | B1 * | 1/2021 | Rutland .................... | G06T 7/73 |
| 10,974,826 | B2 * | 4/2021 | Karem .................... | B64C 11/46 |
| 2012/0029738 | A1 * | 2/2012 | Brunetti .................. | G08G 5/80 340/963 |
| 2014/0347482 | A1 * | 11/2014 | Weinmann ......... | B64D 45/0005 348/144 |
| 2015/0194059 | A1 | 7/2015 | Starr et al. | |
| 2016/0185469 | A1 | 6/2016 | Ujita et al. | |

(Continued)

FOREIGN PATENT DOCUMENTS

| | | |
|---|---|---|
| CN | 107727366 A | 2/2018 |
| JP | 2002-240798 A | 8/2002 |

*Primary Examiner* — Mussa A Shaawat
(74) *Attorney, Agent, or Firm* — Oliff PLC

(57) ABSTRACT

In an aircraft monitoring system for monitoring a fuselage of an aircraft, an imaging device mounted to the fuselage is configured to capture and acquire at least images of driven parts involved in generation of lift or thrust for flight of the aircraft. An image processor is configured to use the captured images to generate an overhead image of the aircraft as viewed from above the fuselage.

5 Claims, 6 Drawing Sheets

(56)        References Cited

U.S. PATENT DOCUMENTS

| | | | |
|---|---|---|---|
| 2017/0021925 A1* | 1/2017 | Weller | G06F 3/00 |
| 2018/0075762 A1 | 3/2018 | Gadgil et al. | |
| 2018/0096610 A1* | 4/2018 | Ray | G08G 5/51 |
| 2018/0273208 A1* | 9/2018 | Ismail | B64F 5/60 |
| 2018/0334251 A1* | 11/2018 | Karem | B64C 3/16 |
| 2019/0031337 A1* | 1/2019 | McCullough | B64C 17/00 |
| 2019/0035291 A1* | 1/2019 | Saxena | H04B 7/18506 |
| 2019/0079511 A1* | 3/2019 | Kessler | G07C 5/0816 |
| 2020/0010187 A1* | 1/2020 | Bevirt | B64C 29/0033 |
| 2020/0377233 A1* | 12/2020 | Harvey | B64F 5/60 |
| 2021/0125410 A1* | 4/2021 | Da Silva | G06T 19/006 |
| 2021/0304390 A1* | 9/2021 | Lowry | H04N 23/63 |
| 2021/0341333 A1* | 11/2021 | Osborn | B64U 20/87 |
| 2022/0036750 A1* | 2/2022 | Poojary | G06T 7/521 |

* cited by examiner

FIG.1

START

TRANSMIT IMAGING INSTRUCTION — S10

CAPTURE IMAGES — S12

PERFORM IMAGE PROCESSING — S14

DETERMINE PRESENCE OR ABSENCE OF OBSTACLE — S16

S18
OBSTACLE PRESENT ?    YES
NO

DRIVE DRIVEN PARTS — S20

CAPTURE IMAGES IN CHRONOLOGICAL ORDER — S22

PERFORM IMAGE PROCESSING — S24

MAKE NORMALITY DETERMINATION — S26

STORE RESULT — S28

DISPLAY RESULT — S30

END

AIRCRAFT MONITORING SYSTEM

CROSS-REFERENCE TO RELATED APPLICATION

This application is a continuation application of International Application No. PCT/JP2022/010588 filed Mar. 10, 2022 which designated the U.S. and claims priority to Japanese Patent Application No. 2021-065814 filed with the Japan Patent Office on Apr. 8, 2021, the contents of each of which are incorporated herein by reference.

BACKGROUND

Technical Field

This disclosure relates to an aircraft monitoring system.

Related Art

Conventionally, inspection systems for inspecting aircraft are known. For example, an appearance inspection system for inspecting the appearance of aircraft is known. In this appearance inspection system, images of the aircraft fuselage surface are captured by irradiating the aircraft fuselage with a stripe pattern, and then damage to the aircraft fuselage is detected based on differences from images acquired in the same manner in the initial state before operation.

BRIEF DESCRIPTION OF THE DRAWINGS

In the accompanying drawings:

FIG. 1 is a schematic diagram of an electric vertical take-off and landing aircraft equipped with an aircraft monitoring system according to one embodiment of the present disclosure;

DESCRIPTION OF SPECIFIC EMBODIMENTS

Figure 2:
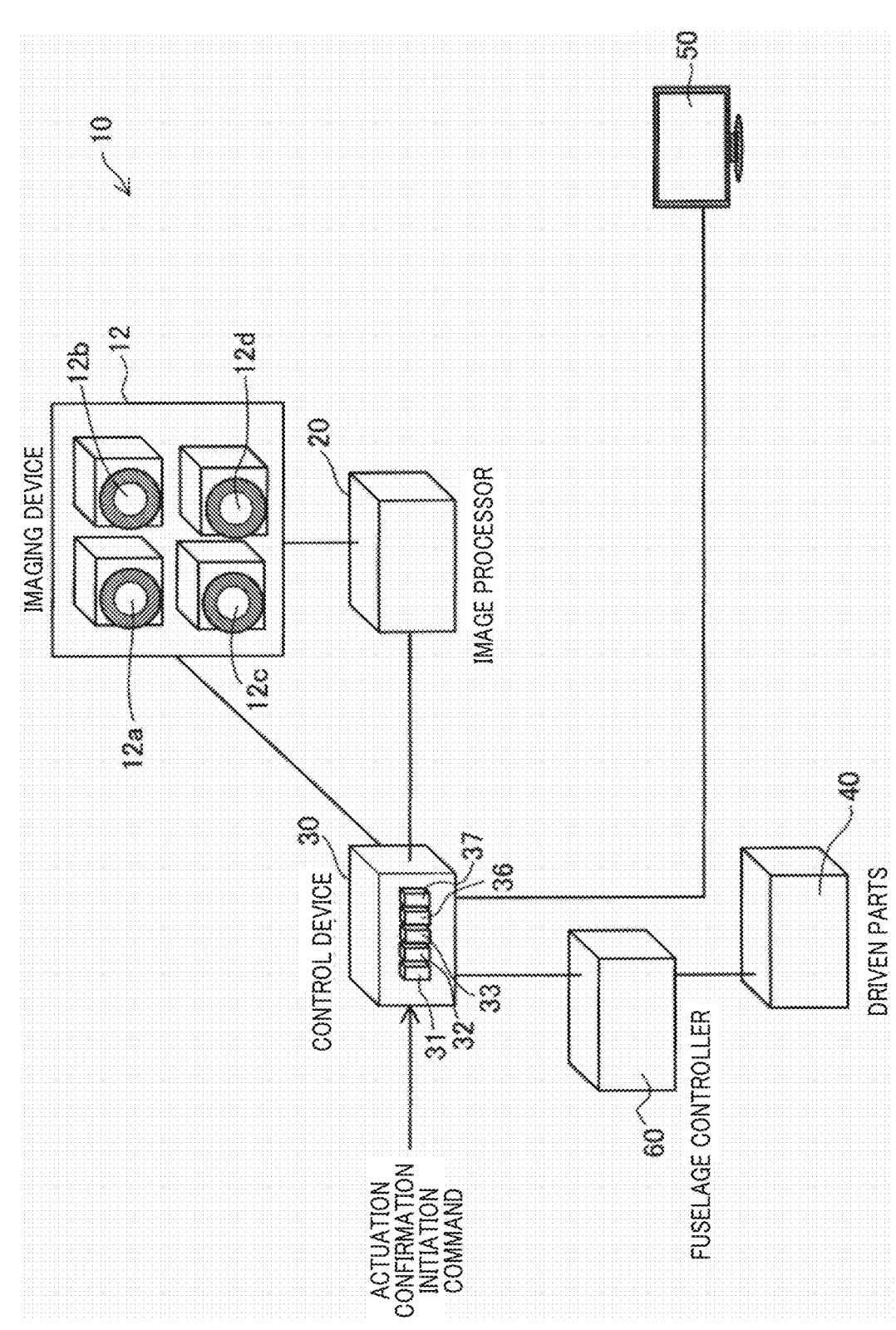
FIG. 2 is a block diagram illustrating a configuration of the aircraft monitoring system.

With the method of the above-known appearance inspection system, as disclosed in JP 2016-112947 A, in which a predefined pattern is projected onto the fuselage, images are captured, and then damage to the fuselage is detected based on the images, appearance defects such as scratches and dents on the fuselage surface can be detected without a person having to conduct a visual inspection. However, there is an issue that this method is not capable of checking for an operational fault, in parts of the aircraft that are driven in connection with generation of lift and thrust, such as propellers and rotor blades. Therefore, it is common practice for a pilot to visually inspect the propellers and rotor blades, which are driven in connection with generation of lift and thrust, before flight to check for an operational fault. As eVTOLs become more common and the number of aircraft in operation increases exponentially, it is expected to become difficult to conduct visual inspections on all aircraft as before, and there is a need to automate and simplify visual inspections of driven parts. Besides, there is an issue that, in the event of a fault occurring during flight, it is impossible to identify the fault. The number of driven parts in an eVTOL is greater than that of a conventional aircraft, making it more difficult to identify the cause of a fault, if any, during flight.

Therefore, there is a need for a technology for checking for an operational fault in the driven parts during flight.

One aspect of the present disclosure provides an aircraft monitoring system for monitoring a fuselage of an aircraft. This aircraft monitoring system includes an imaging device mounted to the fuselage and configured to capture and acquire at least images of driven parts involved in generation of lift or thrust for flight of the aircraft.

The aircraft monitoring system configured as above includes an imaging device mounted to the fuselage and configured to capture and acquire at least images of driven parts involved in generation of lift or thrust for flight of the aircraft. In a situation where the aircraft is landing, such as during pre-flight inspection, this configuration allows confirmation of the presence or absence of faults in the driven parts involved in generation of lift or thrust for flight of the aircraft to be performed without visual inspection. In addition, in the event of a fault occurring in the driven parts involved in generation of lift or thrust for flight of the aircraft during flight, this configuration enables confirmation of a fault condition. Therefore, it is possible to confirm, during landing and flight of the aircraft, the presence or absence of an operational fault in the driven parts of the aircraft and a fault condition.

The present disclosure may also be implemented in various forms. For example, the present disclosure may be implemented in the form of a control method for an aircraft monitoring system that monitors the fuselage of an aircraft.

A. First Embodiment

A-1. System Configuration

Figure 1:
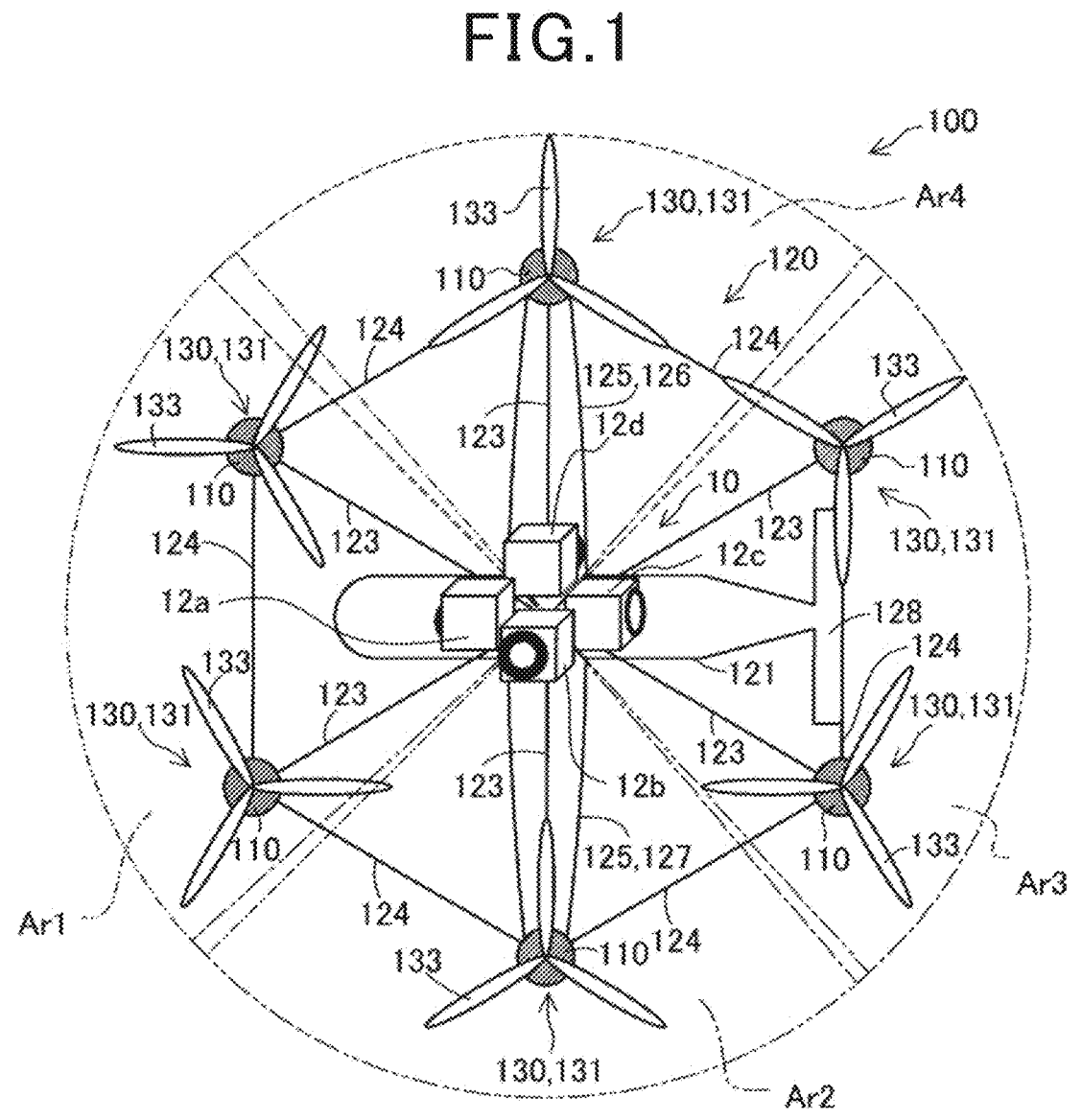

As illustrated in FIG. 1, an aircraft monitoring system 10 according to one embodiment of the present disclosure is mounted to an electric vertical take-off and landing aircraft 100 (hereinafter also referred to as "eVTOL 100"). In the present embodiment, the aircraft monitoring system 100 monitors the eVTOL 100. First, the e VIOL 100 will now be described.

The eVTOL 100 is configured as a manned aircraft that is electrically driven and capable of vertical take-off and landing. As illustrated in FIG. 1, the eVTOL 100 includes a main body 120, a plurality of rotors 130, and a plurality of electric drive systems 110 (hereinafter also referred to as "EDS(s) 110") for driving respective rotors 130. The eVTOL 100 of the present embodiment is equipped with six rotors 130, six EDSs 110, and six tilt drive units (not shown). The number of rotors 130, the number of EDSs 110, and the number of tilt drive units are not limited to six each, but may be any number.

The main body 120 corresponds to the part of the eVTOL 100 excluding the six rotors 130, the six EDSs 110, and the six tilt drive units. The main body 120 includes a fuselage 121, a fuselage bracing strut (not shown), six first supports 123, six second supports 124, primary wings 125, and a tail wing 128.

The fuselage 121 constitutes a fuselage portion of the eVTOL 100. A crew compartment (not shown) is formed inside the fuselage 121. The fuselage bracing strut (not shown) has a substantially columnar visual appearance extending in the vertical direction and is fixed to the top of the fuselage 121. In the present embodiment, the fuselage bracing strut is disposed at a position that overlaps the center of gravity (not shown) of the main body of the eVTOL 100 as viewed from the vertical direction. One end of each of the six first supports 123 is fixed to the upper end of the fuselage bracing strut. The six first supports 123 each have a substantially rod-like visual appearance and are disposed radially at equal angular intervals from each other so as to extend in a plane perpendicular to the vertical direction. The rotors 130 and the EDSs 110 are disposed at the other ends of the respective first supports 123, that is, at the ends of the respective first supports 123 located away from the fuselage bracing strut. The six second supports 124 each have a substantially rod-like visual appearance and connect the other ends of the respective first supports 123 (the ends of the respective first supports 123, not connected to the fuselage bracing strut) adjacent to each other.

The primary wings 125 consist of a right wing 126 and a left wing 127. The right wing 126 is formed to extend rightward from the fuselage 121. The left wing 127 is formed to extend leftward from the fuselage 121. The tail wing 128 is formed at the rear end of the fuselage 121.

The six rotors 130 act as lift rotors to generate thrust vertically upward during take-off and landing, mainly to generate lift for the main body 120, and then act as cruise rotors to be deflected by the tilt drive units to a direction capable of generating thrust backward in the direction of propulsion, mainly to generate thrust for the main body 120. Each rotor 130 is driven to rotate independently of one another about its respective axis of rotation. Each rotor 130 includes three blades 133 disposed equiangularly spaced from each other.

The six EDSs 110 are configured as drives for driving the respective rotors 130 to rotate. The tilt drive units are used to change the direction in which the rotors 130 generate thrust.

The aircraft monitoring system 10 will now be described. As illustrated in FIG. 2, the aircraft monitoring system 10 includes an imaging device 12, an image processor 20, a control device 30, and an overhead image display unit 50.

As illustrated in FIGS. 1 and 2, in the present embodiment, the imaging device 12 includes four cameras 12a-12d. The four cameras 12a-12d are attached to the main body 120. Specifically, the four cameras 12a-12d are disposed and mounted above the fuselage bracing strut (not shown) such that the imaging directions of the cameras are different from each other. As illustrated in FIG. 1, the imaging coverages Ar1-Ar4 of the respective cameras 12a-12d are indicated by dashed lines and dashed-dotted lines. The cameras 12a-12d capture images to include the driven parts 40 of the eVTOL 100. The term "driven parts" means parts of the eVTOL 100 that are driven in connection with generation of lift or thrust for the flight of the eVTOL 100. In the present embodiment, the "parts of the eVTOL 100 that are driven in connection with generation of lift or thrust for the flight of the eVTOL 100" include parts capable of generating lift or thrust for flight of the eVTOL 100 and parts used to generate lift or thrust for flight of the eVTOL 100. The driven parts 40 include, for example, the rotors 130, moving blades, such as ailerons, elevators, and rudders (not shown), and the EDSs 110, and the tilt drive units. The driven parts 40 may include, but are not limited to the rotors 130, moving blades, such as ailerons, elevators, and rudders (not shown), and the EDSs 110, and the tilt drive units, any types of components that are driven in connection with generation of lift or thrust for flight of the eVTOL 100.

The image processor 20 generates an overhead image of the eVTOL 100 as viewed from above the main body 120 using the imaging images captured by the imaging device 12.

The overhead image display unit 50 is installed in the cockpit of the eVTOL 100 in the present embodiment. In the present embodiment, the overhead image display unit 50 includes a liquid crystal display. The overhead display device 50 displays an overhead image generated by the image processor 20.

Figure 3:
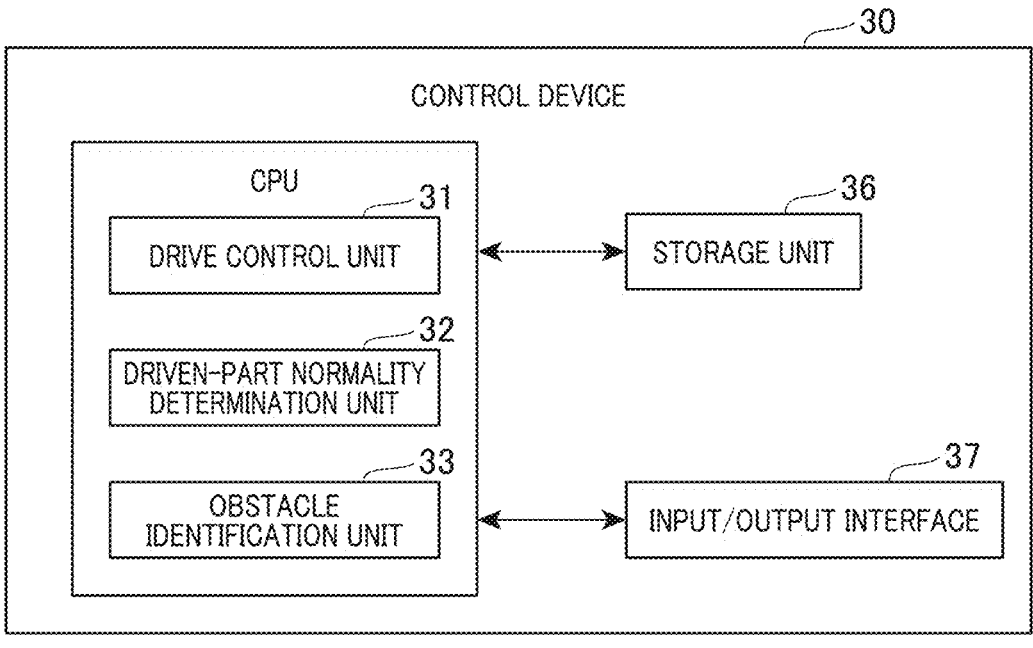
FIG. 3 is a block diagram illustrating a configuration of a control device.

The control device 30 controls the overall operations of the aircraft monitoring system 10. As illustrated in FIG. 3, the control device 30 is configured as a computer including a storage unit 36, an input/output interface 37, and a central processing unit (CPU). The storage unit 36 includes a read only memory (ROM) and a random access memory (RAM).

The input/output interface 37 is used to input and output instructions and output values between the control device 30 and external devices. For example, the input/output interface 37 inputs an actuation confirmation initiation command from an external device. Such an external device may be, for example, a management and control computer, such as a server device that controls the actuation confirmation and records results of the actuation confirmation. Such a management and control computer may be, for example, a server device disposed in an air traffic control room, or a personal computer brought to the eVTOL 100 operation site by a maintenance worker who performs actuation confirmation. The drive instruction information (such as an instruction value of tilt angle to the tilt drive unit) entered via the input/output interface 37 is transmitted from the control device 30 to the fuselage controller 60. The fuselage controller 60 drives the driven parts 40.

The CPU acts as a drive control unit 31, a driven-part normality determination unit 32, and an obstacle identification unit 33 by executing a control program stored beforehand in a storage unit 36.

The drive control unit 31 controls the imaging device 12. For example, the drive control unit 31 transmits imaging instructions to the imaging device 12.

The driven-part normality determination unit 32 drives the driven parts 40 by transmitting drive instruction information for the driven parts 40 to the fuselage controller 60. The driven-part normality determination unit 32 determines the normality of actuation of the driven parts 40 based on such drive instruction information and images acquired by the imaging device 12.

The obstacle identification unit 33 determines the presence or absence of obstacles within a predefined distance from each of the driven parts 40. Details of how to determine the presence or absence of obstacles will be described later.

A-2. Actuation Confirmation Process

Figure 4:
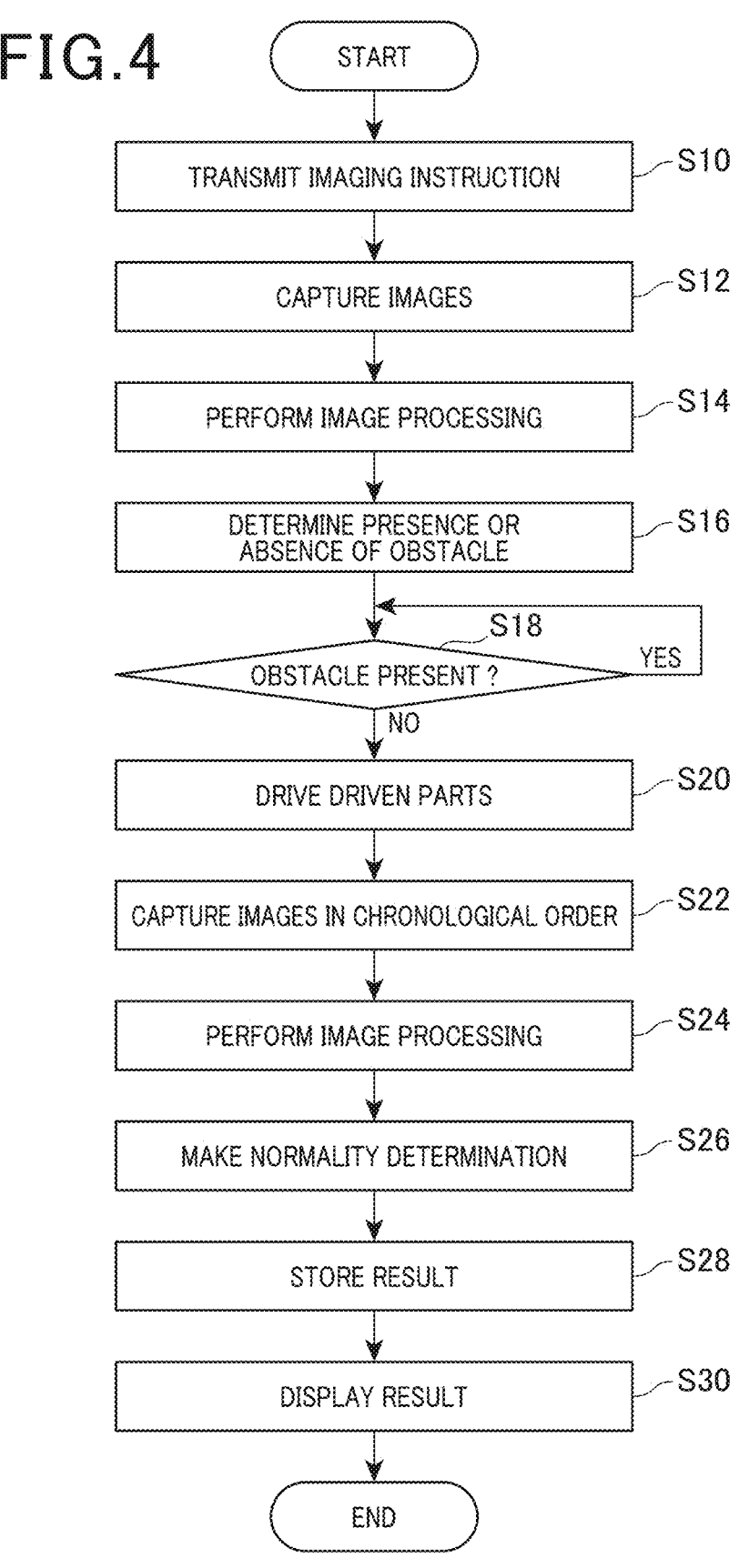
FIG. 4 is a flowchart illustrating a procedure of an activation confirmation process.

In the present embodiment, upon the aircraft monitoring system 10 receiving an actuation confirmation initiation command via the input/output interface 37, an actuation confirmation process as illustrated in FIG. 4 is performed. The actuation confirmation process is performed by the aircraft monitoring system 10 to confirm drive of the driven parts 40.

The drive control unit 31 transmits an imaging instruction to the imaging device 12 (at step S10). The imaging device 12 acquires a plurality of ambient images by capturing images of the driven parts 40 and surroundings of the driven parts 40 (at step S12). Such a plurality of ambient images mean a plurality of images captured by the plurality of cameras at approximately the same tune.

The image processor 20 uses the plurality of ambient images to generate an overhead image of the eVTOL 100 as viewed from above the main body 120 (at step S14).

The obstacle identification unit 33 determines the presence or absence of an obstacle within a predefined distance from each of the driven parts 40 based on the overhead image generated at step S14 (at step S16). For example, the obstacle identification unit 33 uses the overhead image to determine whether there is any person or object within 1 meter (m) from each of the rotors 130.

If it is determined that an obstacle is present (at step S18: YES branch), the process flow returns to step S18. That is, while an obstacle is present, the process flow will not proceed to any step subsequent to step S18. If it is determined that no obstacle is present (at step S18: NO branch), the driven-pan normality determination unit 32 drives the driven parts 40 by transmitting drive instruction information to the fuselage controller 60 (at step S20).

The imaging device 12 captures a predetermined number of times images of the driven parts 40 and surroundings of the driven parts 40 in chronological order at predefined time intervals (at step S22). The image processor 20 generates an overhead image of the eVTOL 100 as viewed from above the main body 120 using the plurality of images captured at step S22 (at step S24). At step S24, the image processor 20 generates an overhead image using the plurality of images captured by the plurality of cameras substantially at the same time. The image processor 20 generates overhead images substantially at the same tune intervals using the plurality of images captured by the plurality of cameras in chronological order at step S22.

The driven-part normality determination unit 32 determines the normality of actuation of the driven parts 40 based on drive instruction information and the overhead images generated at step S24 (at step S26). Specifically, for example, if drive instruction information is directed to the tilt drive units with a tilt angle instruction value of 45 degrees, it is determined whether the tilt angle of each driven part 40 driven by the tilt drive unit is tilted to 45 degrees in a plurality of chronologically acquired overhead images.

The driven-part normality determination unit 32 stores a result of determination by the driven-part normality determination unit 40 in the storage unit 36 (at step S28). The result of determination by the driven-part normality determination unit 40 is displayed on the overhead image display unit 50 (at step S30). Specifically, for each driven part, the result indicating whether the driven part is normal or abnormal is textually displayed.

The main body 120 in the present embodiment corresponds to a fuselage in the claims.

The aircraft monitoring system 10 of the present embodiment described above includes the imaging device 12 that is mounted to the main body 120 and acquires captured images of the driven parts 40 involved in generation of lift or thrust for flight of the eVTOL 100. In a situation where the eVTOL 100 is landing, such as during pre-flight inspection, this configuration allows confirmation of the presence or absence of faults in the driven parts involved in generation of lift or thrust for flight of the aircraft to be performed without a person having to conduct a visual inspection.

The image processor 20 generates an overhead image of the eVTOL 100 as viewed from above the main body 120 using images acquired by the imaging device 12, and the overhead image is displayed on the overhead image display unit 50, allowing the operator or pilot to intuitively confirm whether there is an operational fault in the driven parts 40 of the eVTOL 100.

Furthermore, when the driven parts 40 are driven according to the drive instruction information, a plurality of images are acquired by capturing images of the driven parts 40 in chronological order, and normality of actuation of the driven parts is determined using such a plurality of captured images, thus improving the accuracy of the normality determination as compared to in a configuration using a single image.

Before driving the driven parts 40, the obstacle identification unit 33 determines the presence or absence of an obstacle within a predefined distance from each of the driven parts 40 based on ambient images of the driven parts 40 and the surroundings of the driven parts 40, thereby reducing human errors in safety checks and improving safety during inspections.

Figure 5:
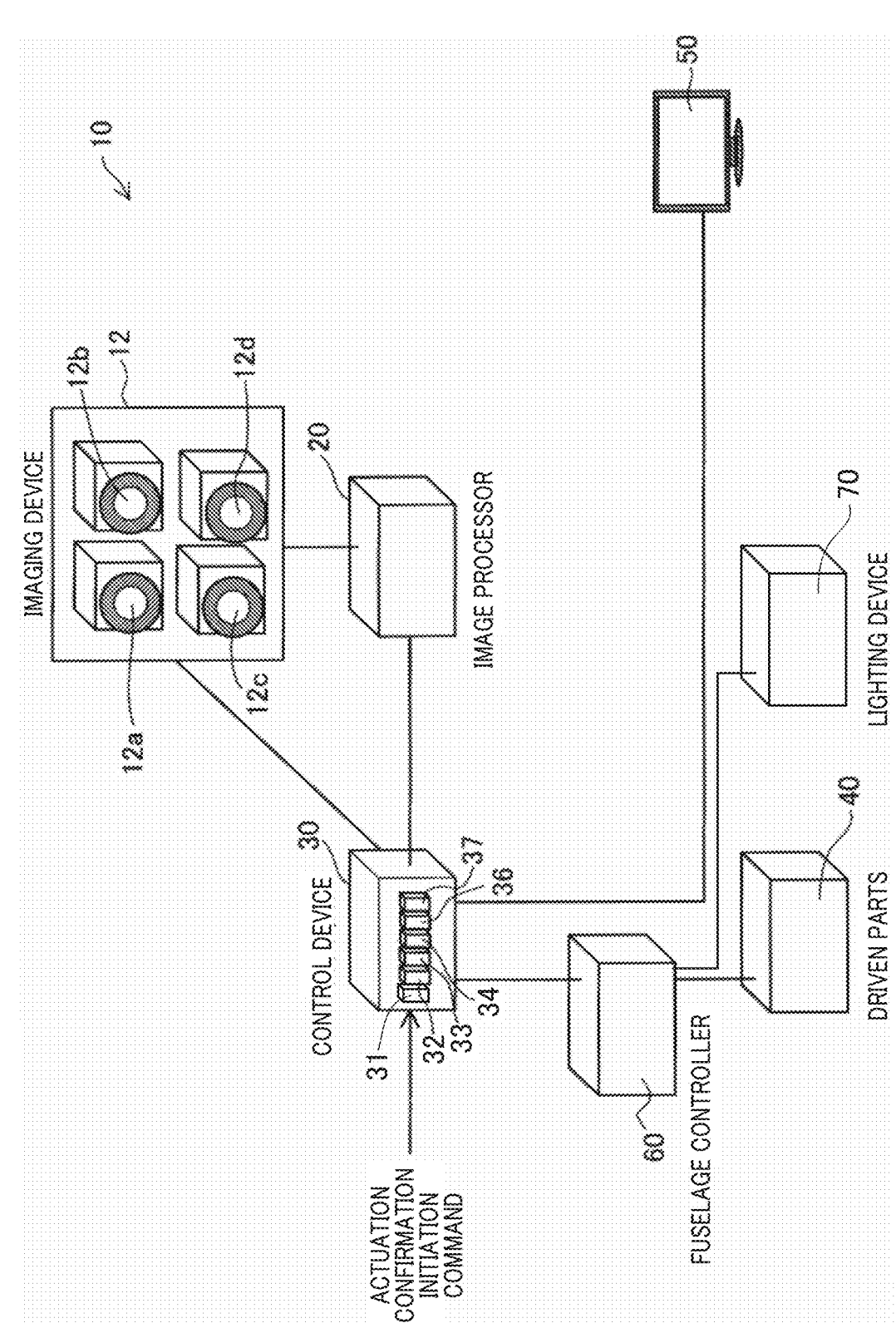
FIG. 5 is a block diagram illustrating a configuration of an aircraft monitoring system according to another embodiment of the present disclosure.
Figure 6:
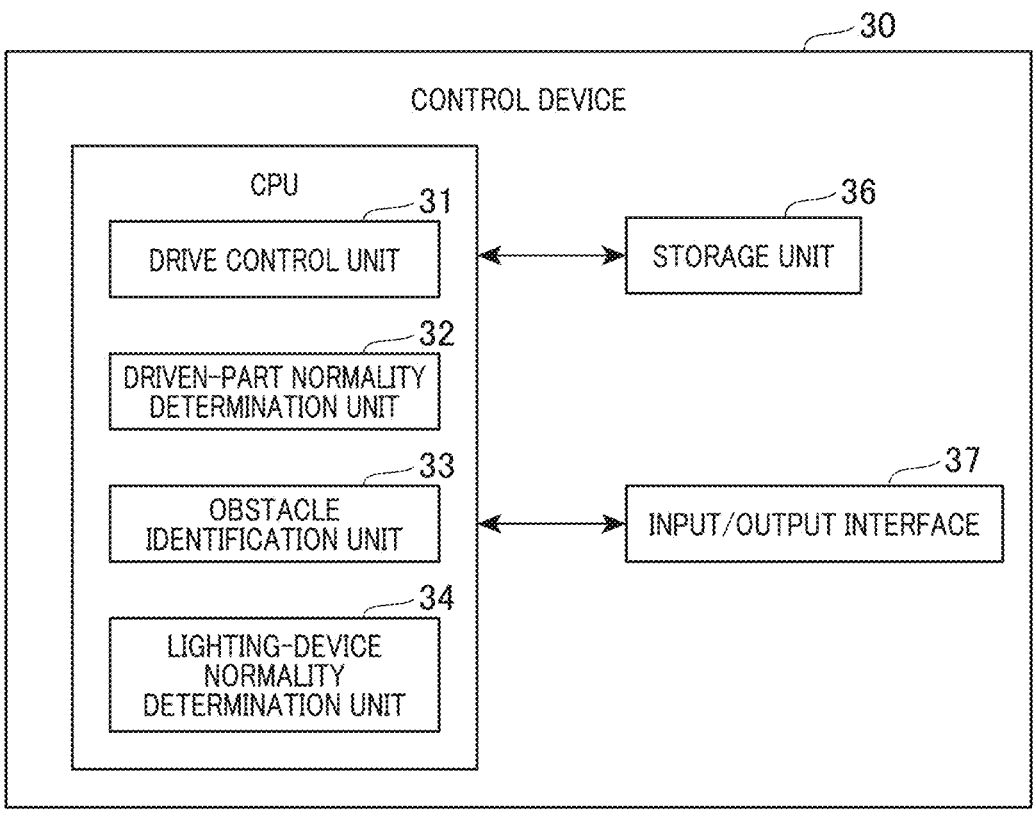
FIG. 6 is a block diagram illustrating a configuration of a control device of the aircraft monitoring system in FIG. 5.

B. Other Embodiments (B1) In the aircraft monitoring system 10 of the present embodiment (see FIGS. 5 and 6), the imaging device 12 may further capture images of a lighting device 70 mounted to the main body 120, and a lighting-device normality determination unit 34 may be further provided. The lighting-device normality determination unit 34 further drives the lighting device 70 by transmitting, to the fuselage controller 60 that drives the driven parts 40, lighting instruction information instructing the lighting device 70 to turn on and off, and determines the normality of actuation of the lighting device 70 based on the lighting instruction information and the images of the lighting device 70 captured by the imaging device. The lighting-device normality determination unit 34 may be configured to make at least one of: a determination that the lighting device 70 is normal when the luminance of the lighting device 70 in images acquired at an arbitrary time after the timing at which the lighting instruction information instructing the lighting device to turn on is transmitted is equal to or greater than a predefined first threshold value; and a determination that the lighting device 70 is normal when the luminance of the lighting device 70 in images acquired at an arbitrary time after the timing at which the lighting instruction information instructing the lighting device 70 to turn off is transmitted is equal to or less than a second threshold value less than the first threshold. Since the normality of actuation of the lighting device 70 is determined based on quantitative values of luminance of the lighting device 70, it is possible to quantitatively inspect the normality of actuation of the lighting device 70. In this embodiment, the CPU acts as the lighting-device normality determination unit 34, as well as the drive control unit 31, the driven-part normality determination unit 32, and the obstacle identification unit 33, by executing a control program stored beforehand in the storage unit 36.

(B2) In the aircraft monitoring system 10 of the above-described embodiment, images captured by the imaging device 12, that is, images before being processed into overhead images, may be displayed in addition to, or instead of, the overhead images. This will make it easier partially display an operational fault in the driven parts 40 of the eVTOL 100. In this configuration, the overhead image display unit 50 corresponds to a captured-image display unit. A captured-image display unit other than the overhead image display unit 50 may be added to display captured images.

(B3) In the above-described embodiment, the aircraft monitoring system 10 is mounted to the eVTOL 100. Alternatively, the aircraft monitoring system 10 may be mounted not only to the eVTOL 100, but also to any type of aircraft, for example, a jet plane or a helicopter. In the above-described embodiment, the eVTOL 100 is configured as a manned aircraft. Alternatively, the eVTOL 100 may be configured as an unmanned aircraft.

(B4) In the aircraft monitoring system 10 of the above-described embodiment, the imaging device 12 is mounted to the main body 120 and acquires captured images of the driven parts 40 involved in generation of lift or thrust for the flight of the eVTOL 100 and captured images of surroundings of the driven parts 40. Alternatively, the imaging device 12 may only acquire captured images of the driven parts 40. In other words, the imaging device 12 may only have to capture at least images of the driven parts 40 and acquire the captured images.

(B5) In the aircraft monitoring system 10 of the above-described embodiment, the cameras 12a-12d of the imaging device 12 are disposed above the fuselage bracing strut (not shown). Alternatively, the cameras 12a-12d of the imaging device 12 may be disposed in different positions from the fuselage bracing strut. The cameras 12a-12d of the imaging device 12 may be disposed dispersedly on the main body 120 away from the fuselage bracing strut. The cameras 12a-12d of the imaging device 12 may be disposed dispersedly, for example, on the travel direction side of the fuselage 121 and on the backward direction side of the fuselage 121. A plurality of cameras may be disposed together on the tail wing 128.

(B6) The imaging device 12 is equipped with four cameras 12a-12d. Alternatively, the imaging device 12 may be equipped with any number, not limited to four, of cameras.

(B7) In the aircraft monitoring system 10 of the above-described embodiment, the image processor 20 generates overhead images of the eVTOL 100 as viewed from above the main body 120. Alternatively, a camera may be disposed in a position that enables overhead images to be acquired as viewed from all directions, not just as viewed from above the main body 120. A camera having the accuracy capable of detecting damage such as scratches and dents on the airframe surface may be provided, which may implement detection of damage to the fuselage as well as a check for a fault in driven parts.

(B8) In the aircraft monitoring system 10 of the above-described embodiment, the actuation confirmation process includes textually displaying, for each driven part, a result of determination as to whether the driven part is normal or abnormal on the overhead image display unit 50. Alternatively, the actuation confirmation process may include displaying, for each driven part in the overhead image, a result of determination as whether the driven part is normal or abnormal in a different color.

(B9) In the aircraft monitoring system 10 of the above-described embodiment, the actuation confirmation process is performed by driving the driven palls 40 while the eVTOL 100 is not in flight. Alternatively, the actuation confirmation process may be performed while the eVTOL 100 is in flight. Specifically, upon detecting a fault in any of the driven parts 40 during flight of the eVTOL 100, the drive control unit may provide an instruction to cause the imaging device 12 to capture images of the fault and display an imaging result on the captured-image display unit 50, thereby confirming a fault condition.

The present disclosure is not limited to any of the embodiments, examples or modifications described above but may be implemented by a diversity of other configurations without departing from the scope of the disclosure. For example, the technical features of the embodiments, examples or modifications corresponding to the technical features of the respective aspects may be replaced or combined appropriately, in order to solve some or all of the issues described above or in order to achieve some or all of the advantages described above. Any of the technical features may be omitted appropriately unless the technical feature is described as essential herein.

The control device and the method thereof described in the present disclosure may be realized by a dedicated computer provided by configuring a processor and memory programmed to perform one or more functions embodied in a computer program. Alternatively, the control device and the method thereof described in the present disclosure may be realized by a dedicated computer provided by configuring a processor with one or more dedicated hardware logic circuits. Alternatively, the control device and the method thereof described in the present disclosure may be realized by one or more dedicated computers configured by a combination of a processor and memory programmed to perform one or more functions, and a processor configured with one or more hardware logic circuits. In addition, the computer program may be stored in a computer-readable, non-transitory tangible storage medium as instructions to be executed by a computer.

What is claimed is:

1. An aircraft monitoring system for monitoring a fuselage of an aircraft, comprising:

an imaging device mounted to the fuselage and configured to capture and acquire at least images of driven parts involved in generation of lift or thrust for flight of the aircraft;

a drive control unit configured to control the imaging device; and a driven-part normality determination unit configured to drive the driven parts by transmitting drive instruction information for the driven parts to a fuselage controller, and determine normality of actuation of the driven parts based on the drive instruction information and the captured images, wherein the imaging device is configured to, when the driven parts are driven according to the drive instruction information, acquire a plurality of the captured images by capturing images of the driven parts 40 in chronological order, and the driven-part normality determination unit is configured to determine normality of actuation of the driven parts using the plurality of the captured images acquired by the imaging device.

2. The aircraft monitoring system according to claim 1, further comprising:

an obstacle identification unit configured to determine presence or absence of an obstacle within a predefined distance from each of the driven parts based on ambient images acquired by the imaging device capturing images of surroundings of the driven parts, as well as the driven parts, wherein the driven-part normality determination unit is configured to, in response to the obstacle identification unit determining that no obstacles are present, drive the driven parts by transmitting the drive instruction information to the fuselage controller.

3. The aircraft monitoring system according to claim 1, further comprising:

a captured-image display unit configured to display the captured images acquired by the imaging device.

4. An aircraft monitoring system for monitoring a fuselage of an aircraft, comprising:

an imaging device mounted to the fuselage and configured to capture and acquire at least images of driven parts involved in generation of lift or thrust for flight of the aircraft; and a lighting-device normality determination unit configured to drive a lighting device mounted to the fuselage by transmitting, to a fuselage controller that drives the driven parts, lighting instruction information instructing the lighting device to turn on and off, and determine normality of actuation of the lighting device based on the lighting instruction information and images of the lighting device captured by the imaging device, wherein the lighting-device normality determination unit is configured to make at least one of:

a determination that the lighting device is normal when a luminance of the lighting device in images acquired at an arbitrary time after a timing at which the lighting instruction information instructing the lighting device to turn on is transmitted is equal to or greater than a predefined first threshold value; and a determination that the lighting device is normal when a luminance of the lighting device in images acquired at an arbitrary time after a timing at which the lighting instruction information instructing the lighting device to turn off is transmitted is equal to or less than a second threshold value less than the first threshold.

5. The aircraft monitoring system according to claim 4, further comprising:

a captured-image display unit configured to display the captured images acquired by the imaging device.

* * * * *